(12) United States Patent
Tremaine

(10) Patent No.: US 7,567,756 B2
(45) Date of Patent: Jul. 28, 2009

(54) METHOD OF AUTOMATIC ADJUSTMENT OF DITHER AMPLITUDE OF MEMS MIRROR ARRAYS

(75) Inventor: Brian P. Tremaine, San Jose, CA (US)

(73) Assignee: Capella Photonics, San Jose, CA (US)

( * ) Notice: Subject to any disclaimer, the term of this patent is extended or adjusted under 35 U.S.C. 154(b) by 321 days.

(21) Appl. No.: 11/197,934

(22) Filed: Aug. 3, 2005

(65) Prior Publication Data

US 2007/0166034 A1    Jul. 19, 2007

(51) Int. Cl.
*H04J 14/00* (2006.01)
(52) U.S. Cl. .................................................. 398/45
(58) Field of Classification Search ............. 398/45–46; 385/16–18
See application file for complete search history.

(56) References Cited

U.S. PATENT DOCUMENTS

| | | | | |
|---|---|---|---|---|
| 4,618,808 | A | * 10/1986 | Ish-Shalom et al. | 318/696 |
| 5,629,790 | A | 5/1997 | Neukermans et al. | 359/198 |
| 5,745,271 | A | 4/1998 | Ford et al. | 398/87 |
| 5,835,458 | A | 11/1998 | Bischel et al. | 369/44.12 |
| 5,868,480 | A | 2/1999 | Zeinali | 353/31 |
| 5,960,133 | A | 9/1999 | Tomlinson | 385/18 |
| 5,974,207 | A | 10/1999 | Aksyuk et al. | 385/24 |
| 6,172,777 | B1 | 1/2001 | Flood et al. | 359/10 |

(Continued)

OTHER PUBLICATIONS

"Optical MEMS for Photonic Switching—Compact and Stable Optical Crossconnect Switches for Simple, Fast, and Flexible Wavelength Applications in Recent Photonic Networks", Mitsuhiro Yano et al., IEEE journal of selected topics in quantum electronics, vol. 11, No. 2, Mar./Apr. 2005.*

(Continued)

*Primary Examiner*—Quan-Zhen Wang
(74) *Attorney, Agent, or Firm*—Joshua D. Isenberg; JDI Patent

(57) ABSTRACT

Methods for adjusting dither amplitude for MEMS mirrors in optical switches and optical switches employing such a method are disclosed. A dither amplitude of one or more MEMS mirrors may be adjusted in an optical switch having an input port, and an array of one or more MEMS mirrors that can be selectively optically coupled to one or more of N≧3 optical input/output (I/O) ports. The MEMS mirrors are aligned mirrors to achieve nominal peak coupling at each of the N collimators. Digital-to-analog (DAC) settings for positioning mirrors in an open control loop as a function of the selected collimator are stored to a non-volatile memory. The DAC settings are used to determine a dither amplitude DITHER(x) for one of the MEMS mirrors positioned to couple optical signals to an output port at a position x. The optical switch apparatus may comprise N≧3 optical input/output (I/O) ports, an array of one or more MEMS mirrors that can selectively reflect one or more spectral channels to one or more of the N ports, and a servo-control assembly in communication with said one or more of the MEMS mirrors. The servo assembly includes memory containing digital-to-analog converter (DAC) settings for positioning each mirror in an open control loop as a function of a port position x. The servo control assembly is programmed to adjust dither amplitude of one or more of the MEMS mirrors using the stored DAC settings.

14 Claims, 7 Drawing Sheets

U.S. PATENT DOCUMENTS

| | | | |
|---|---|---|---|
| 6,193,376 B1 | 2/2001 | Hayashi et al. | 353/30 |
| 6,204,946 B1 | 3/2001 | Aksyuk et al. | 398/9 |
| 6,205,269 B1 | 3/2001 | Morton | 385/24 |
| 6,222,954 B1 | 4/2001 | Riza | 385/18 |
| 6,243,507 B1 * | 6/2001 | Goldstein et al. | 385/13 |
| 6,259,841 B1 | 7/2001 | Bhagavatula | 385/47 |
| 6,263,127 B1 | 7/2001 | Dragone et al. | 385/24 |
| 6,263,135 B1 | 7/2001 | Wade | 385/37 |
| 6,289,155 B1 | 9/2001 | Wade | 385/37 |
| 6,307,657 B1 | 10/2001 | Ford | 398/9 |
| 6,327,398 B1 | 12/2001 | Solgaard et al. | 385/18 |
| 6,343,862 B1 | 2/2002 | Sawai et al. | 353/1 |
| 6,345,133 B1 | 2/2002 | Morozov | 385/24 |
| 6,381,387 B1 | 4/2002 | Wendland, Jr. | 385/37 |
| 6,411,751 B1 * | 6/2002 | Giles et al. | 385/16 |
| 6,415,073 B1 | 7/2002 | Cappiello et al. | 385/24 |
| 6,418,250 B1 | 7/2002 | Corbosiero et al. | 385/24 |
| 6,439,728 B1 | 8/2002 | Copeland | 359/515 |
| 6,453,087 B2 | 9/2002 | Frish et al. | 385/24 |
| 6,549,699 B2 | 4/2003 | Belser et al. | 385/24 |
| 6,625,346 B2 | 9/2003 | Wilde | 385/24 |
| 6,634,810 B1 | 10/2003 | Ford et al. | 398/88 |
| 6,647,172 B2 | 11/2003 | Giles et al. | 385/18 |
| 6,657,770 B2 | 12/2003 | Marom et al. | 359/290 |
| 6,661,393 B2 | 12/2003 | Tegreene et al. | 345/7 |
| 6,661,945 B2 | 12/2003 | Tedesco et al. | 385/24 |
| 6,661,948 B2 | 12/2003 | Wilde | 385/24 |
| 6,687,431 B2 | 2/2004 | Chen et al. | 385/24 |
| 6,695,457 B2 | 2/2004 | van Drieenhuizen et al. | 359/872 |
| 6,704,476 B2 | 3/2004 | Ford et al. | 385/18 |
| 6,757,458 B2 | 6/2004 | Neilson et al. | 385/18 |
| 6,760,511 B2 | 7/2004 | Garrett et al. | 385/24 |
| 6,771,855 B2 | 8/2004 | Pezeshki et al. | 385/31 |
| 6,798,941 B2 | 9/2004 | Smith et al. | 385/18 |
| 6,820,988 B2 | 11/2004 | van Drieenhuizen et al. | 359/872 |
| 6,845,195 B2 | 1/2005 | Tedesco | 385/37 |
| 6,958,861 B1 | 10/2005 | Argueta-Diaz | 359/618 |
| 6,975,785 B2 | 12/2005 | Ghandi et al. | 385/16 |
| 7,062,120 B2 | 6/2006 | Shiozaki et al. | 385/18 |
| 7,076,146 B2 | 7/2006 | Sufleta et al. | 385/140 |
| 7,162,115 B2 | 1/2007 | Brophy et al. | 385/16 |
| 7,236,660 B2 | 6/2007 | Ducellier | 385/24 |
| 7,330,617 B2 * | 2/2008 | Aota et al. | 385/18 |
| 2002/0176657 A1 | 11/2002 | Burke et al. | 385/18 |
| 2003/0095307 A1 | 5/2003 | Moon et al. | 398/45 |
| 2004/0120713 A1 * | 6/2004 | Ward et al. | 398/45 |
| 2004/0146298 A1 * | 7/2004 | Ikegame | 398/45 |
| 2004/0160687 A1 | 8/2004 | Van Drieenhuizen et al. | 359/872 |
| 2005/0074204 A1 | 4/2005 | Wilson et al. | 385/24 |
| 2006/0093256 A1 | 5/2006 | Yamashita et al. | 385/18 |
| 2006/0093257 A1 | 5/2006 | Aota et al. | 385/18 |
| 2006/0140536 A1 | 6/2006 | Aota et al. | 385/18 |
| 2006/0228070 A1 | 10/2006 | Davis et al. | 385/16 |
| 2006/0228071 A1 | 10/2006 | Davis et al. | 385/16 |
| 2006/0245030 A1 | 11/2006 | Pan | 359/291 |

OTHER PUBLICATIONS

U.S. Appl. No. 11/469,394 to Joseph E. Davis et al., filed Aug. 31, 2006.
U.S. Appl. No. 11/840,182 to Mark H. Garrett, filed Aug. 16, 2007.
"The International Search Report" and "The Written Opinion of the International Searching Authority" for International application No. PCT/US2006/008639.
"The International Search Report" and "The Written Opinion of the International Searching Authority" for International application No. PCT/US2006/043169.
International application No. PCT/US2006/024075, "The International Search Report and The Written Opinion of the International Searching Authority".

* cited by examiner

METHOD OF AUTOMATIC ADJUSTMENT OF DITHER AMPLITUDE OF MEMS MIRROR ARRAYS

FIELD OF THE INVENTION

Embodiments of the present invention relate to optical systems and more particularly to optical systems employing MEMS mirror arrays to couple light from input fibers to output fibers using collimators and free space optics.

BACKGROUND OF THE INVENTION

Multi-channel optical signals typically comprise a plurality of spectral channels, each having a distinct center wavelength and an associated bandwidth. The center wavelengths of adjacent channels are spaced at a predetermined wavelength or frequency interval, and the plurality of spectral channels may be wavelength division multiplexed to form a composite multi-channel signal of the optical network. Each spectral channel is capable of carrying separate and independent information. At various locations, or nodes, in the optical network, one or more spectral channels may be dropped from or added to the composite multi-channel optical signal, as by using, for example, a reconfigurable optical add-drop multiplexer (ROADM).

Reconfigurable optical add-drop architectures utilize a wavelength-separating-routing (WSR) apparatus and methods employing an array of fiber collimators providing an input port and a plurality of output ports; a wavelength-separator; a beam-focuser; and an array of channel micromirrors. Reconfigurable optical add-drop architectures are disclosed in commonly assigned U.S. Pat. Nos. 6,549,699, 6,625,346, 6,661,948, 6,687,431, and 6,760,511, the disclosures of which are incorporated by reference herein.

In operation, a multi-wavelength optical signal emerges from the input port. The wavelength-separator separates the multi-wavelength optical signal into multiple spectral channels; each characterized by a distinct center wavelength and associated bandwidth. The beam-focuser focuses the spectral channels into corresponding spectral spots. The channel micromirrors are positioned such that each channel micromirror receives one of the spectral channels. The channel micromirrors are individually controllable and movable, e.g., continuously pivotable (or rotatable), so as to reflect the spectral channels into selected output ports. As such, each channel micromirror is assigned to a specific spectral channel, hence the name "channel micromirror". And each output port may receive any number of the reflected spectral channels. A distinct feature of the channel micromirrors in this architecture, in contrast to those used previously, is that the motion, e.g., pivoting (or rotation), of each channel micromirror is under analog control such that its pivoting angle can be continuously adjusted. This enables each channel micromirror to scan its corresponding spectral channel across all possible output ports and thereby direct the spectral channel to any desired output port.

The above-mentioned U.S. patents also refer to a means for achieving optimal coupling by using a dither scheme. Dithering a MEMS mirror is a means of determining the peak coupling of an optical communication path. The amount of dither used is a tradeoff between adding an unwanted disturbance to the optical path and having sufficient dither signal for servo control. Unfortunately, the process involved in building a MEMS device results in parameter variations from mirror to mirror. It would be advantageous to tune each MEMS mirror to avoid the process variation.

Thus, there is a need in the art, for a method to set the dither amplitude based on the individual MEMS characteristics.

SUMMARY OF THE INVENTION

Embodiments of the present invention are directed to methods for adjusting dither amplitude for MEMS mirrors in optical switches and optical switches employing such a method. According to an embodiment of the present invention, a dither amplitude of one or more MEMS mirrors may be adjusted in an optical switch having an input port, and an array of one or more MEMS mirrors that can be selectively optically coupled to one or more of $N \geq 3$ optical input/output (I/O) ports. The MEMS mirrors are aligned mirrors to achieve nominal peak coupling at each of the n collimators. Digital-to-analog (DAC) settings for positioning mirrors in an open control loop as a function of the selected collimator are stored to a non-volatile memory. The DAC settings are used to determine a dither amplitude DITHER(x) for one of the MEMS mirrors positioned to couple optical signals to an output port at a position x.

In a particular embodiment, DITHER(x) may be determined by fitting the N signal values to a polynomial of a parameter corresponding to a position of an output port, determining a slope of the polynomial at a value of the parameter corresponding to a given output port, and determining the DITHER(x) based on the value of the slope.

According to another embodiment of the invention, an optical switch apparatus may comprise $N \geq 3$ optical input/output (I/O) ports, an array of one or more MEMS mirrors that can selectively reflect one or more spectral channels to one or more of the N ports, and a servocontrol assembly in communication with said one or more of the MEMS mirrors. The servocontrol assembly is adapted to control the channel micromirrors and thereby maintain a predetermined coupling of each reflected spectral channel into one of the output ports. The servo control assembly includes memory containing digital-to-analog converter (DAC) settings for positioning each mirror in an open control loop as a function of a port position x. The servo control assembly also includes a processing unit programmed with a set of instructions for implementing a method of adjusting a dither amplitude of one or more of the MEMS mirrors. The instructions include an instruction for determining a dither amplitude DJTHER(x) for one of the MEMS mirrors positioned to couple optical signals to an output port at a position x using the stored DAC settings.

BRIEF DESCRIPTION OF THE DRAWINGS

The teachings of the present invention can be readily understood by considering the following detailed description in conjunction with the accompanying drawings, in which.

Figure 1A:
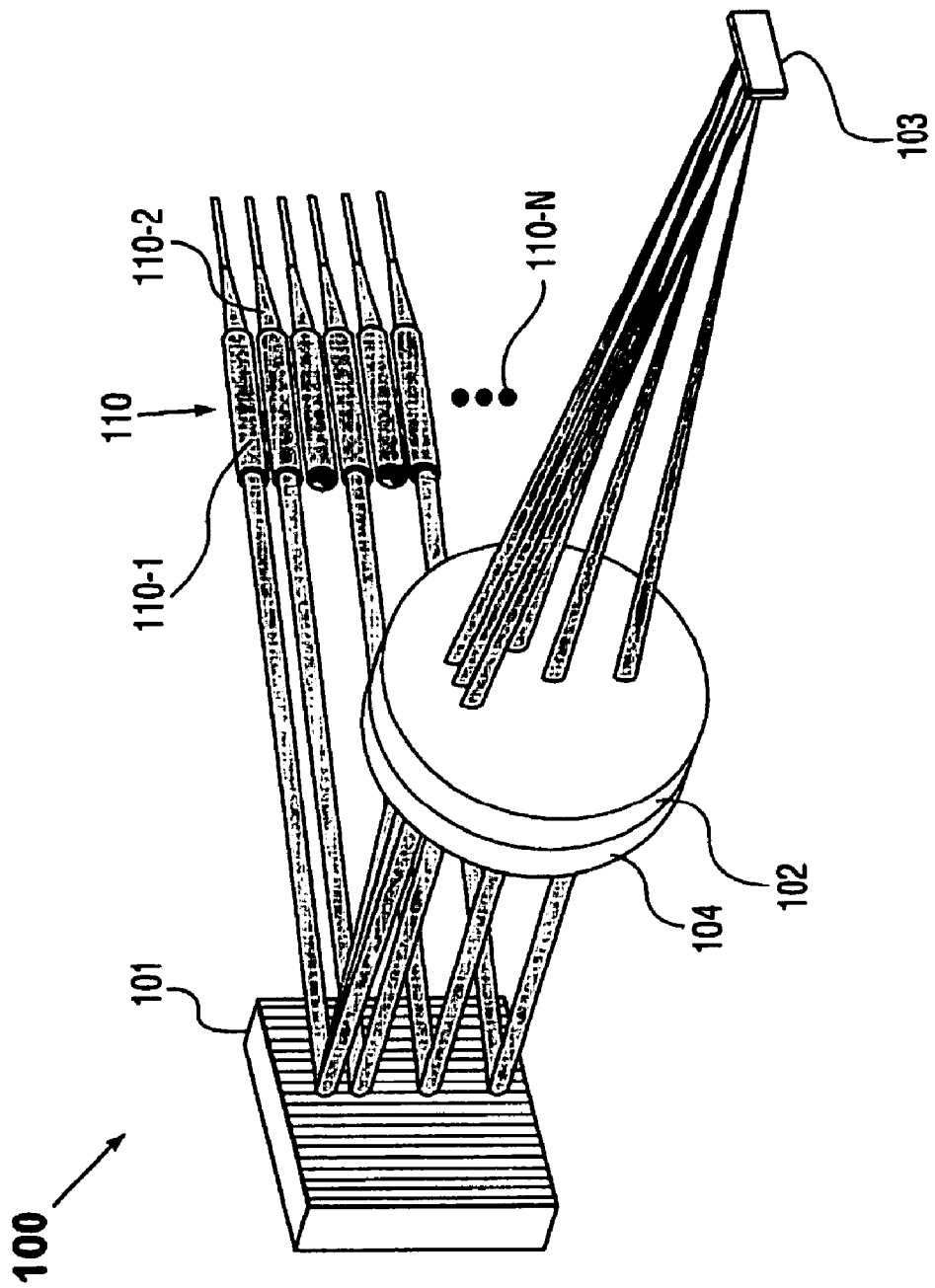
FIG. 1A depicts a wavelength-separating-routing (WSR) apparatus of a type that may be used with embodiments of the present invention.
Figure 1B:
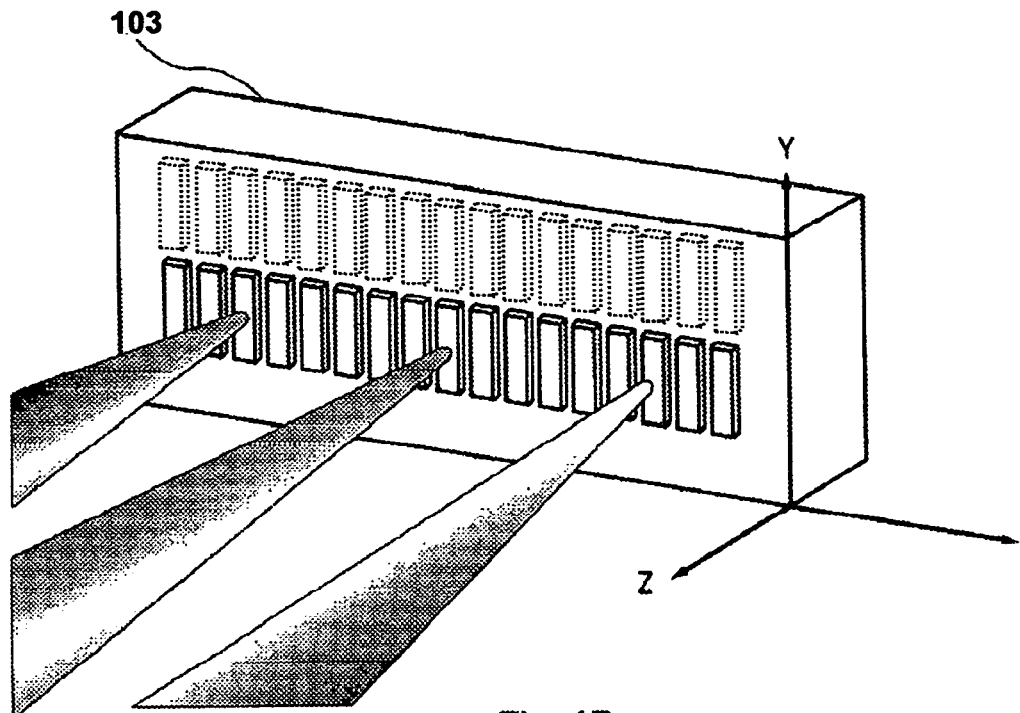

Depicted in FIG. 1B is a close-up view of the array of channel micromirrors 103 shown in the apparatus of FIG. 1A.

Figure 1C:
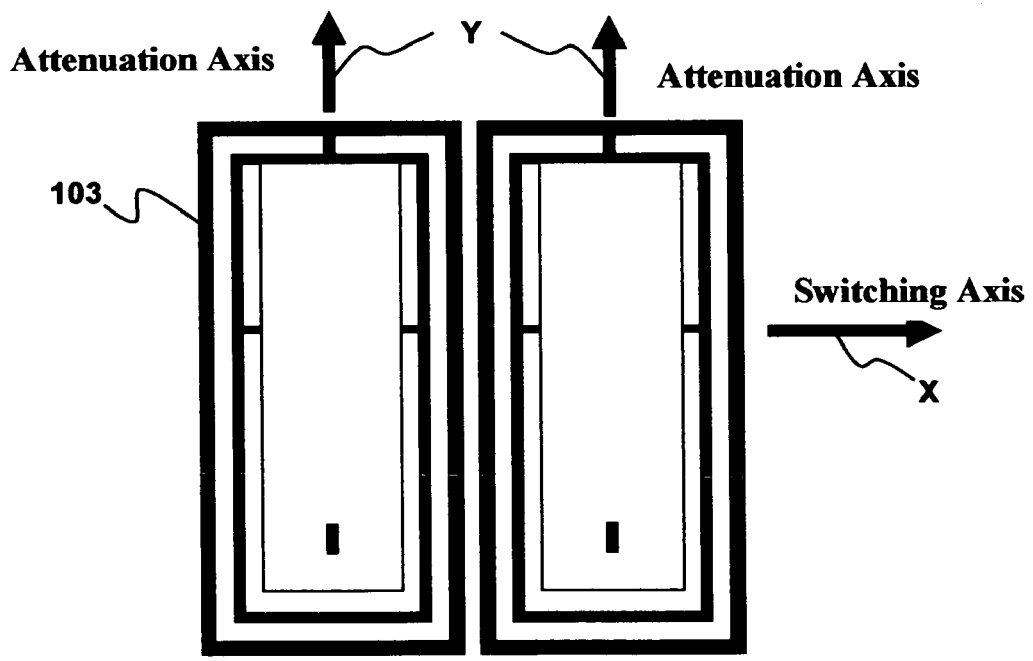

FIG. 1C is a schematic diagram of a bi-axial mirror array for use with the apparatus of FIG. 1A.

Figure 1D:
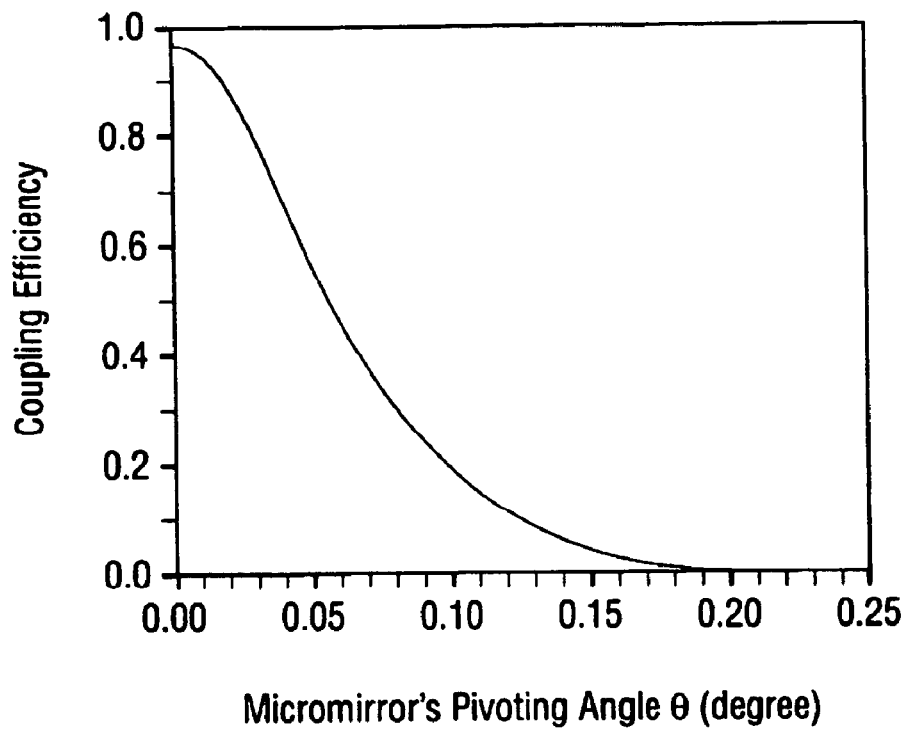

FIG. 1D is a plot of coupling efficiency as a function of a channel micromirror's pivoting angle $\theta$.

Figure 1E:
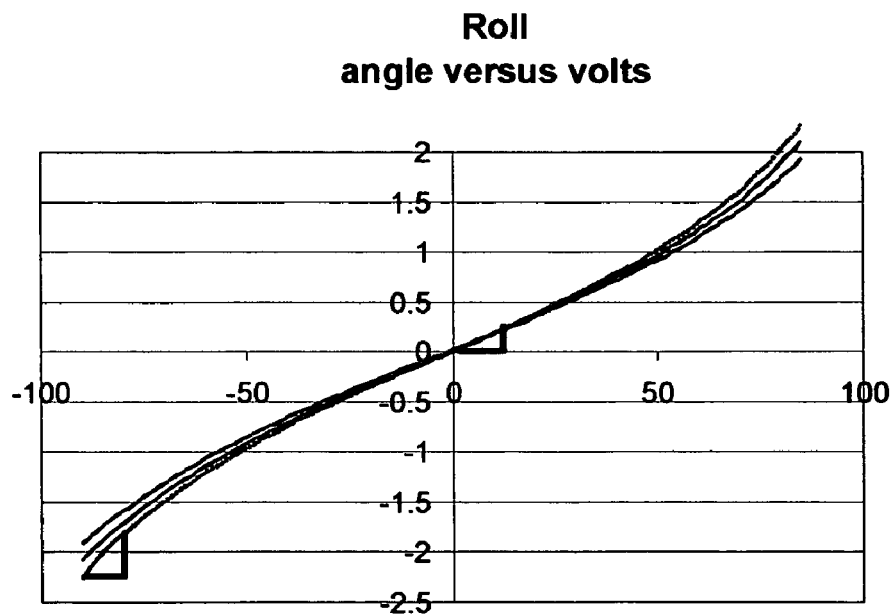

FIG. 1E is a graph depicting MEMS mirror rotation angle versus applied voltage.

Figure 2:
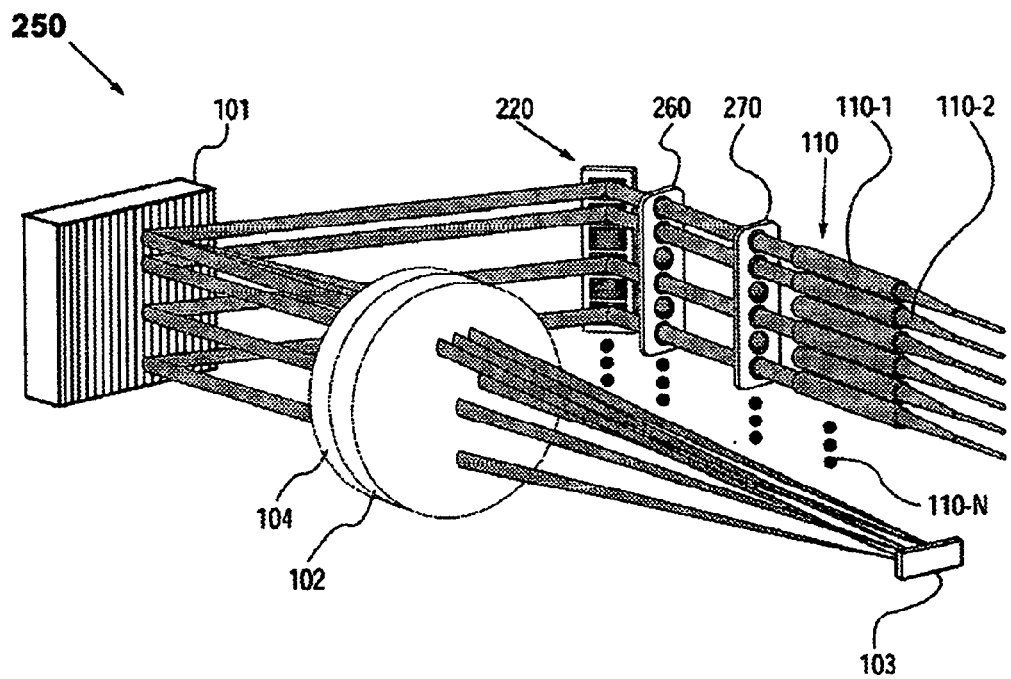

FIG. 2 is a schematic diagram of an alternative WSR apparatus of a type that may be used with embodiments of the present invention.

Figure 3:
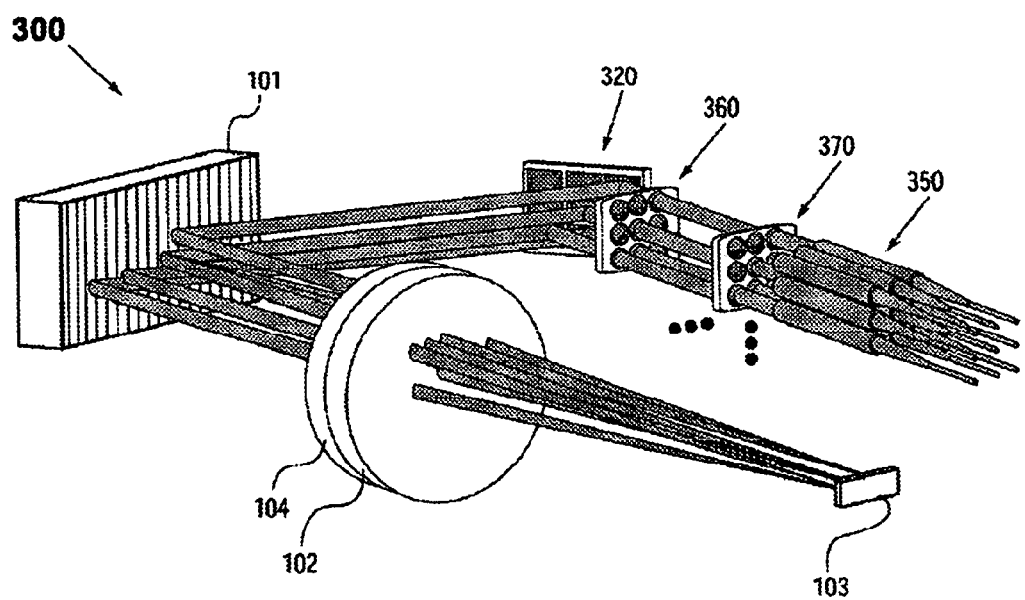

FIG. 3 is a schematic diagram of another alternative WSR apparatus of a type that may be used with embodiments of the present invention.

Figure 4:
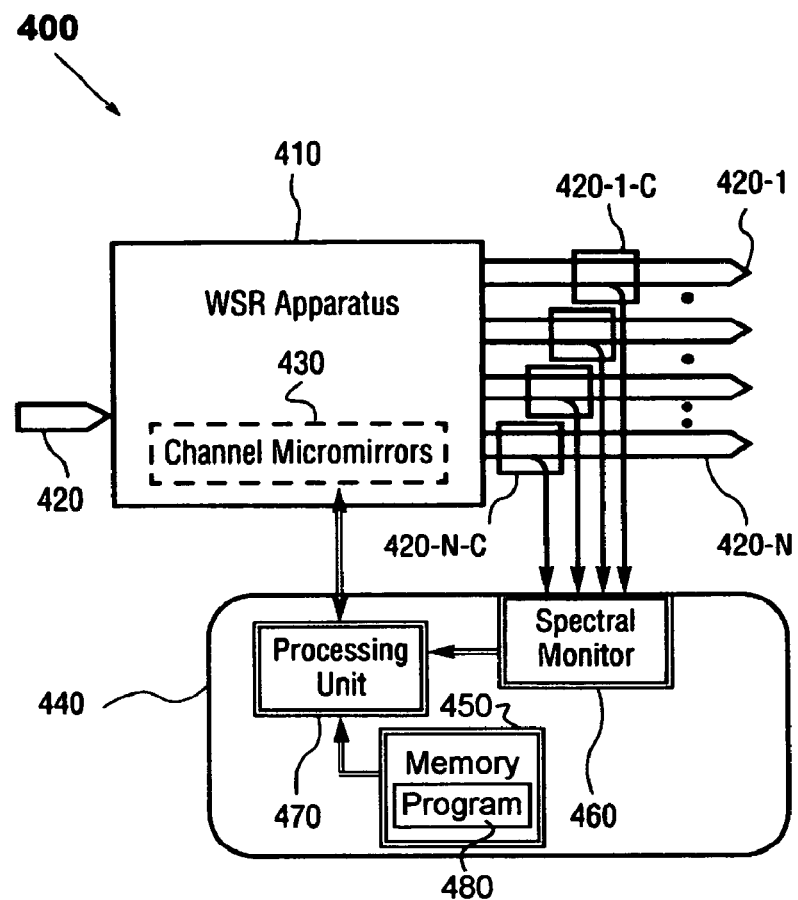

FIG. 4 is a schematic diagram of a WSR-S apparatus having a servo-control according to an embodiment of the present invention.

Figure 5:
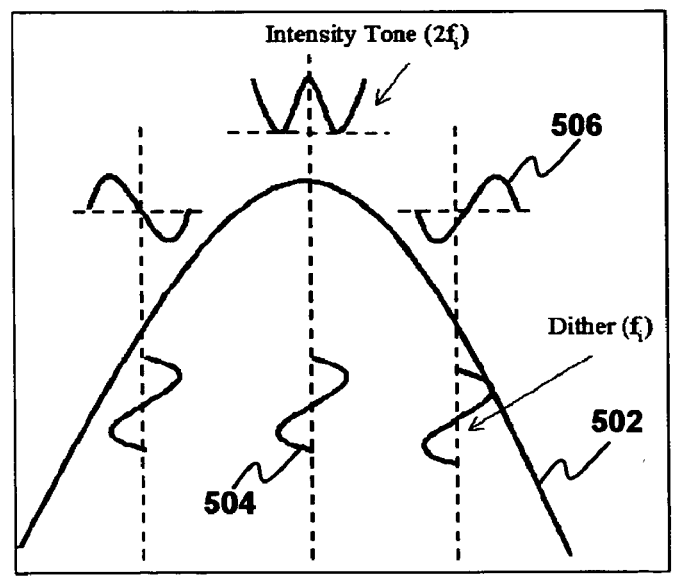

FIG. 5 is a graph of optical coupling versus mirror rotation illustrating the process of dithering.

Figure 6:
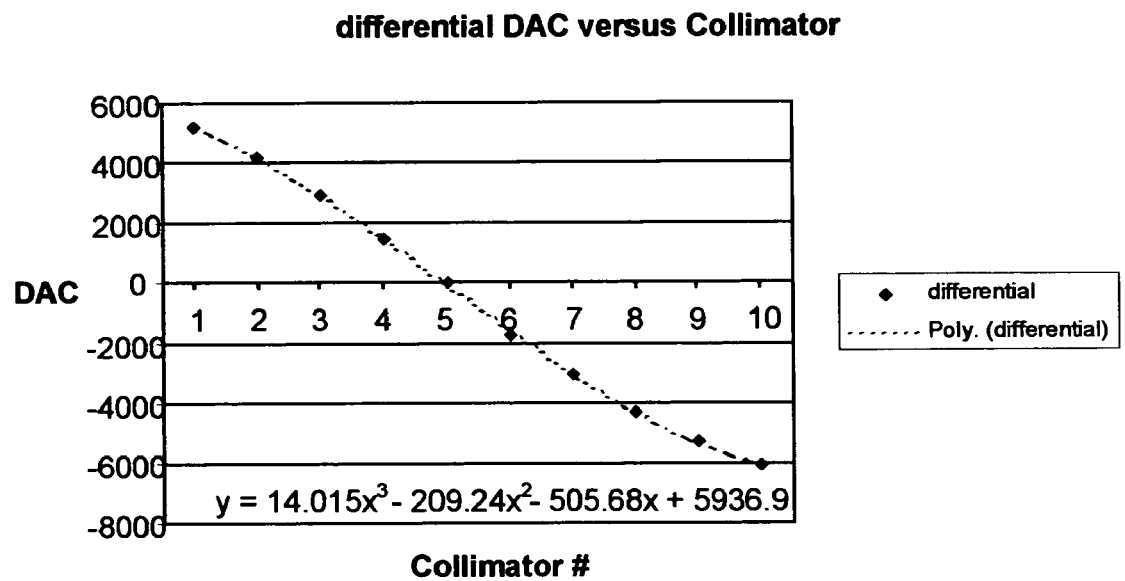

FIG. 6 is a graph illustrating digital-to-analog conversion (DAC) setting for a channel micromirror versus port number.

Figure 7:
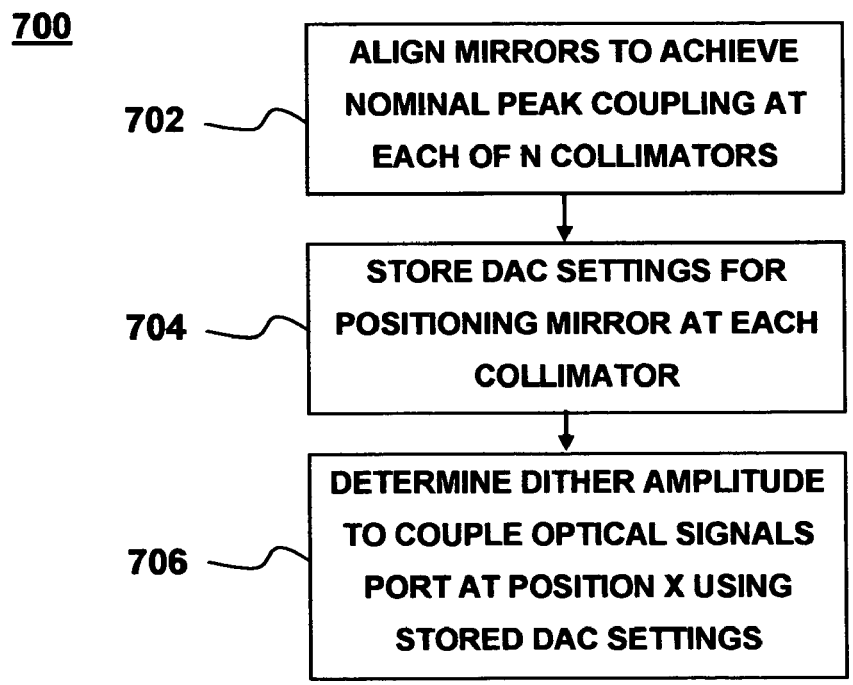

FIG. 7 is a flow diagram illustrating a method for adjusting dither amplitude of one or more MEMS mirrors in an optical switch according to an embodiment of the present invention.

Figure 8:
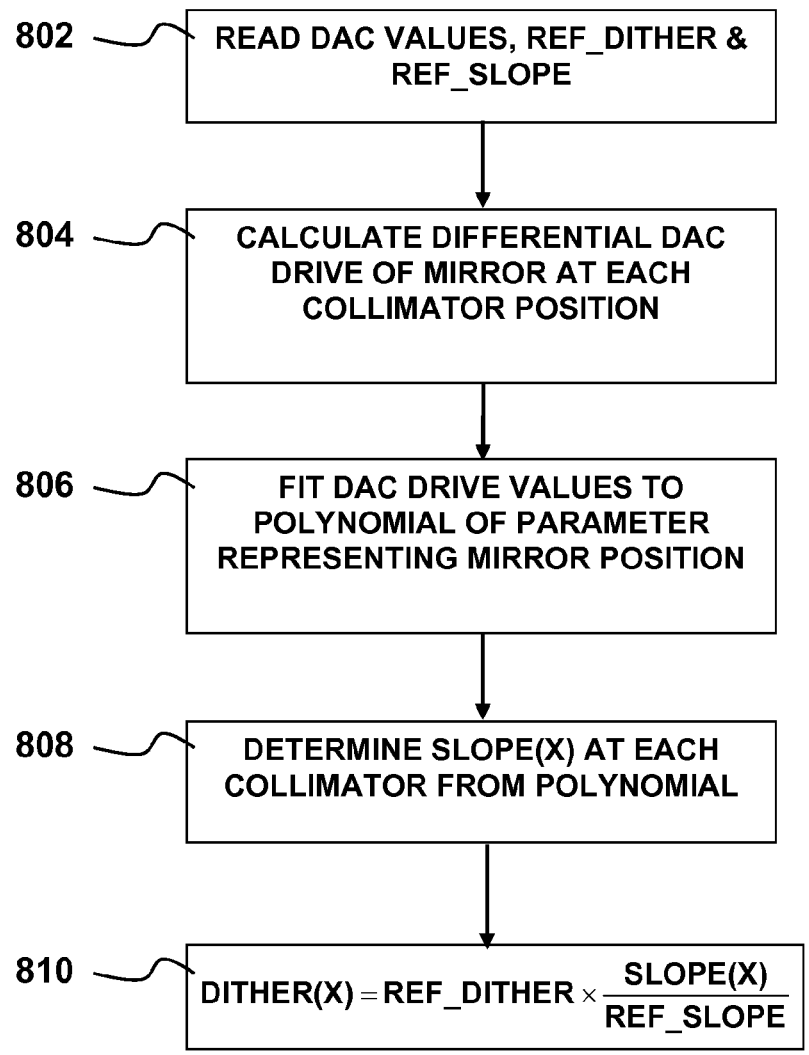

FIG. 8 is a flow diagram illustrating a method for adjusting dither amplitude of one or more MEMS mirrors in an optical switch according to another embodiment of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

FIG. 1A depicts a wavelength-separating-routing (WSR) apparatus 100 of a type that may be used with embodiments of the present invention. By way of example to illustrate the general principles and the topological structure of a wavelength-separating-routing (WSR) apparatus of the present invention, the WSR apparatus 100 comprises multiple input/output ports which may be in the form of an array of fiber collimators 110, providing an input port 110-1 and a plurality of output ports 110-2 through 110-N (N≧3); a wavelength-separator which in one form may be a diffraction grating 101; a beam-focuser in the form of a focusing lens 102; and an array of channel micromirrors 103.

In operation, a multi-wavelength optical signal emerges from the input port 110-1. The diffraction grating 101 angularly separates the multi-wavelength optical signal into multiple spectral channels, which are in turn focused by the focusing lens 102 into a spatial array of corresponding focused spots (not shown in FIG. 1A). The channel micromirrors 103 are positioned in accordance with the spatial array formed by the spectral channels, such that each channel micromirror receives one of the spectral channels. The channel micromirrors 103 are individually controllable and movable, e.g., pivotable (or rotatable) under analog (or continuous) control, such that, upon reflection, the spectral channels are directed into selected ones of the output ports 110-2 through 110-N by way of the focusing lens 102 and the diffraction grating 101. As such, each channel micromirror in the array 103 is assigned to a specific spectral channel, hence the name "channel micromirror". Each output port may receive any number of the reflected spectral channels. By way of example, the channel micromirrors 103 may be electrostatically actuated micro-electromechanical systems (MEMS) mirrors. Examples of suitable MEMS mirrors are described in detail, e.g., in U.S. Pat. Nos. 6,695,457 and 6,820,988, the entire disclosures of which are incorporated herein by reference. Embodiments of the present invention are not limited to electrostatic MEMS mirrors but can also apply to MEMS mirrors with other forms of actuation such as voice-coil motor or magnetostatic actuation.

For purposes of illustration and clarity, only a select few (e.g., three) of the spectral channels, along with the input multi-wavelength optical signal, are graphically illustrated in FIG. 1A and the following figures. It should be noted, however, that there can be any number of the spectral channels in a WSR apparatus of the present invention (so long as the number of spectral channels does not exceed the number of channel mirrors employed in the system). It should also be noted that the optical beams representing the spectral channels shown in FIG. 1A and the following figures are provided for illustrative purpose only. That is, their sizes and shapes may not be drawn according to scale. For instance, the input beam and the corresponding diffracted beams generally have different cross-sectional shapes, so long as the angle of incidence upon the diffraction grating is not equal to the angle of diffraction, as is known to those skilled in the art.

In the embodiment of FIG. 1A, it is preferable that the diffraction grating 101 and the channel micromirrors 103 are placed respectively in the first and second (i.e., the front and back) focal planes (on the opposing sides) of the focusing lens 102. Such a telecentric arrangement allows the chief rays of the focused beams to be parallel to each other and generally parallel to the optical axis. In this application, the telecentric configuration further allows the reflected spectral channels to be efficiently coupled into the respective output ports, thereby minimizing various translational walk-off effects that may otherwise arise. Moreover, the multi-wavelength input optical signal is preferably collimated and circular in cross-section. The corresponding spectral channels diffracted from the diffraction grating 101 are generally elliptical in cross-section; they may be of the same size as the input beam in one dimension and elongated in the other dimension.

It is known that the diffraction efficiency of a diffraction grating is generally polarization-dependent. For instance, the diffraction efficiency of a grating in a standard mounting configuration may be considerably higher for p (or TM) polarization (perpendicular to the groove lines on the grating) than for s (or TE) polarization (orthogonal to p-polarization), or vice versa. To mitigate such polarization-sensitive effects, a quarter-wave plate 104 may be optically interposed between the diffraction grating 101 and the channel micromirrors 103, and preferably placed between the diffraction grating 101 and the focusing lens 102 as is shown in FIG. 1A. In this way, each spectral channel experiences a total of approximately 90-degree rotation in polarization upon traversing the quarter-wave plate 104 twice. (That is, if an optical beam has p-polarization when first encountering the diffraction grating, it would have predominantly (if not all) s-polarization upon the second encountering, and vice versa.) This ensures that all the spectral channels incur nearly the same amount of round-trip polarization dependent loss.

In the WSR apparatus 100 of FIG. 1A, the diffraction grating 101, by way of example, is oriented such that the focused spots of the spectral channels fall onto the channel micromirrors 103 in a horizontal array, as illustrated in FIG. 1B.

Depicted in FIG. 1B is a close-up view of the array of channel micromirrors 103 shown in the apparatus of FIG. 1A. By way of example, the channel micromirrors 103 may arranged in a one-dimensional array along the x-axis (i.e., the horizontal direction in the figure), so as to receive the focused spots of the spatially separated spectral channels in a one-to-one correspondence. (As in the case of FIG. 1A, only three spectral channels are illustrated, each represented by a converging beam.) In alternative embodiments, the array of channel micromirrors 103 may be a two-dimensional array, e.g., with a second one-dimensional array proximate the first as indicated in phantom in FIG. 1B. The reflective surface of each channel micromirror lies in an x-y plane as defined in the figure and is movable, e.g., pivotable (or deflectable) about an axis along the x-direction in an analog (or continuous) manner. Each spectral channel, upon reflection, is deflected in the y-direction (e.g., downward) relative to its incident direction, so as to be directed into one of the output ports 110-2 through 110-N shown in FIG. 1A. As depicted in FIG. 1C, each channel micromirror 103 may be a biaxial micromirror configured to rotate about a switching axis X and an attenuation axis Y. Although a one-dimensional array of channel micromirrors 103 is depicted and described herein, those of skill in the art will recognize that embodiments of the invention may be readily applied to two-dimensional micromirror arrays as well.

As described above, the motion of each channel micromirror is individually and continuously controllable, such that its position, e.g., pivoting angle, can be continuously adjusted. This enables each channel micromirror to scan its corresponding spectral channel across all possible output ports and thereby direct the spectral channel to any desired output port. To illustrate this capability, FIG. 1D shows a plot of coupling efficiency as a function of a channel micromirror's pivoting angle $\theta$, provided by a ray-tracing model of a WSR apparatus in the embodiment of FIG. 1A. As used herein, the coupling efficiency for a spectral channel is defined as the ratio of the amount of optical power coupled into the fiber core in an output port to the total amount of optical power incident upon the entrance surface of the fiber (associated with the fiber collimator serving as the output port). In the ray-tracing model, the input optical signal is incident upon a diffraction grating with 700 lines per millimeter at a grazing angle of 85 degrees, where the grating is blazed to optimize the diffraction efficiency for the "$-1$" order. The focusing lens has a focal length of 100 mm. Each output port may be provided by a quarter-pitch GRIN lens (2 mm in diameter) coupled to an optical fiber. As displayed in FIG. 1D, the coupling efficiency varies with the pivoting angle $\theta$, and it requires about a 0.2-degree change in $\theta$ for the coupling efficiency to become practically negligible in this exemplary case. As such, each spectral channel may practically acquire any coupling efficiency value by way of controlling the pivoting angle of its corresponding channel micromirror. This is also to say that variable optical attenuation at the granularity of a single wavelength can be obtained in a WSR apparatus of the present invention.

In embodiments of the present invention, the channel mirrors are switched using a digital-to-analog converter (DAC) value to command a rotational angle that points nominally to one of N collimators. To keep the applied voltage reasonable the MEMS are used over a wide rotational range, typically +/−2.5 deg. A graph of mirror angle versus voltage is a non-linear curve as shown, e.g., in FIG. 1E. Curves for three different mirrors are shown by the upper middle and lower curves in FIG. 1E. Those versed in the methods of control systems will recognize that the different slopes in FIG. 1E will result in different control loop stabilities for different mirrors and for the same mirror pointing at different ports.

FIG. 1A provides one of many embodiments of a WSR apparatus according to the present invention. In general, the wavelength-separator is a wavelength-separating means that may be a ruled diffraction grating, a holographic diffraction grating, an echelle grating, a dispersing prism, or other types of spectral-separating means known in the art. The beam-focuser may be a focusing lens, an assembly of lenses, or other beam-focusing means known in the art. The focusing function may also be accomplished by using a curved diffraction grating as the wavelength-separator. The channel micromirrors may be provided by silicon micromachined mirrors, reflective ribbons (or membranes), or other types of beam-deflecting elements known in the art. Each micromirror may be pivoted about one or two axes. It is important that the pivoting (or rotational) motion of each channel micromirror be individually controllable in an analog manner, whereby the pivoting angle can be continuously adjusted so as to enable the channel micromirror to scan a spectral channel across all possible output ports. The underlying fabrication techniques for micromachined mirrors and associated actuation mechanisms are well documented in the art, see e.g., U.S. Pat. No. 5,629,790, which is incorporated herein by reference. Moreover, a fiber collimator is typically in the form of a collimating lens (such as a GRIN lens) and a ferrule-mounted fiber packaged together in a mechanically rigid stainless steel (or glass) tube. The fiber collimators serving as the input and output ports may be arranged in a one-dimensional array, a two-dimensional array, or other desired spatial pattern. For instance, they may be conveniently mounted in a linear array along a V-groove fabricated on a substrate made of silicon, plastic, or ceramic, as commonly practiced in the art. It should be noted, however, that the input port and the output ports need not necessarily be in close spatial proximity with each other, such as in an array configuration (although a close packing would reduce the rotational range required for each channel micromirror). Those skilled in the art will know how to design a WSR apparatus according to the present invention, to best suit a given application.

A WSR apparatus of the present invention may further comprise an array of collimator-alignment mirrors (sometimes referred to as port mirrors), for adjusting the alignment of the input multi-wavelength optical signal and facilitating the coupling of the spectral channels into the respective output ports, as shown in FIGS. 2 and 3.

FIG. 2 depicts an alternative WSR apparatus 250 that may be used with embodiments of the present invention. By way of example, WSR apparatus 250 is built upon and hence shares a number of the elements described above with respect to FIG. 1A, as identified by those labeled with identical numerals. In addition to the components describe above, the WSR apparatus 200 further includes a one-dimensional array 220 of collimator-alignment mirrors (sometimes referred to as port mirrors) 220-1 through 220-N optically interposed between the diffraction grating 101 and the fiber collimator array 110. The collimator-alignment mirror 220-1 is designated to correspond with the input port 110-1, for adjusting the alignment of the input multi-wavelength optical signal and therefore ensuring that the spectral channels impinge onto the corresponding channel micromirrors. The collimator-alignment mirrors 220-2 through 220-N are designated to the output ports 110-2 through 110-N in a one-to-one correspondence, serving to provide angular control of the collimated beams of the reflected spectral channels and thereby facilitating the coupling of the spectral channels into the respective output ports according to desired coupling efficiencies. Each collimator-alignment mirror may be rotatable about one axis, or two axes. Settings for the orientation of each of the collimator alignment mirrors 220-1 to 220-N may be established from a set of stored values with each mirror set to a single position for optimum coupling to its corresponding port.

The apparatus 250 may also include first and second two-dimensional arrays 260, 270 of imagining lenses, which are placed in a 4-f telecentric arrangement with respect to the two-dimensional collimator-alignment mirror array 220 and the fiber collimator array 220. By way of example, the imaging lenses in the first and second arrays 260, 270 may all have the same focal length f. The collimator-alignment mirrors in the array 220 are placed at the respective first (or front) focal points of the imaging lenses in the first array 260. Likewise, the fiber collimators in the fiber collimator array 110 are placed at the respective second (or back) focal points of the imaging lenses in the second array 270. The separation between the first and second arrays 260, 270 of imaging lenses is 2f. In this way, the collimator-alignment mirrors are effectively imaged onto the respective entrance surfaces (i.e., the front focal planes) of the GRIN lenses in the corresponding fiber collimators. Such a telecentric imaging system substantially eliminates translational walk-off of the collimated beams at the output ports that may otherwise occur as the mirror angles change.

FIG. 3 shows another alternative WSR apparatus 300 that can be used with embodiments of the present invention. By way of example, WSR apparatus 300 is built upon and hence shares a number of the elements used in the apparatus of FIG. 1A and FIG. 2, as identified by those labeled with identical numerals. In this case, the one-dimensional fiber collimator array 110 of FIG. 2 is replaced by a two-dimensional array 350 of fiber collimators, providing for an input-port and a plurality of output ports. Accordingly, the one-dimensional collimator-alignment mirror array 220 of FIG. 2 is replaced by a two-dimensional array 320 of collimator-alignment mirrors, and first and second one-dimensional arrays 260, 270 of imaging lenses of FIG. 2 are likewise replaced by first and second two-dimensional arrays 360, 370 of imagining lenses respectively. As in the case of the embodiment of FIG. 2B, the first and second two-dimensional arrays 360, 370 of imaging lenses are placed in a 4-f telecentric arrangement with respect to the two-dimensional collimator-alignment mirror array 320 and the two-dimensional fiber collimator array 350. The channel micromirrors 103 must be pivotable biaxially in this case (in order to direct its corresponding spectral channel to any one of the output ports). As such, the WSR apparatus 300 is equipped to support a greater number of the output ports.

In embodiments of the present invention, the channel micromirrors 103 are controlled by servo-control loops that are integrated into optical switches, e.g., of the types described above with respect to FIG. 1A, FIG. 2 and FIG. 3. FIG. 4A depicts a schematic illustration of a WSR-S apparatus according to an embodiment of the present invention. The WSR-S apparatus 400 comprises a WSR apparatus 410 and a servo-control assembly 440. The WSR apparatus 410 may be substantially similar to the WSR apparatus 100 of FIG. 1A, the WSR apparatus 250 of FIG. 2 or the WSR apparatus 300 of FIG. 3 or any other embodiment in accordance with the present invention. The servo-control assembly 440 includes a spectral power monitor 460, for monitoring the optical power levels of the spectral channels coupled into output ports 420-1 through 420-N of the WSR apparatus 410. By way of example, the spectral power monitor 460 may be coupled to the output ports 420-1 through 420-N by way of fiber-optic couplers 420-1-C through 420-N-C, wherein each fiber-optic coupler serves to "tap off" a predetermined fraction of the optical signal in the corresponding output port. The servo-control assembly 440 further includes a processing unit 470, in communication with the spectral power monitor 460 and the channel micromirrors 430 of the WSR apparatus 410. The servo control assembly 440 may further include a non-volatile memory 450 which may be programmed with instructions in the form of a program 480 that is readable by the processing unit 470. The memory 450 may be a non-volatile memory, such as a read only memory (ROM), disk drive, flash memory or the like.

The program 480 may implement a method of adjusting dither amplitude as described below. The program 480 may be implemented by using digital signal processing (DSP) firmware using a logic chip such as a field programmable gate array (FPGA) as the processor 470 and memory 450. Although the program code 480 is described herein as being implemented in firmware and executed using an FPGA, those skilled in the art will realize that the method of dither amplitude adjustment could alternatively be implemented using hardware such as an application specific integrated circuit (ASIC) or other hardware circuitry. Alternatively, the program 480 may conform to any one of a number of different programming languages such as Assembly, C++, JAVA or a number of other languages. The processing unit 470 and memory 450 may be part of a general-purpose computer that becomes a specific purpose computer when executing programs such as the program 480. As such, it should be understood that embodiments of the invention can be implemented, in whole or in part, in software, hardware or some combination of both. In one embodiment, among others, the program code 480 may include a set of processor readable instructions that implement a method having features in common with the method 700 of FIG. 7 or the method 800 of FIG. 8, both of which are described below.

The processing unit 470 uses the optical power measurements from the spectral power monitor 460 to provide feedback control of the channel micromirrors 430 on an individual basis, so as to maintain a desired coupling efficiency for each spectral channel into a selected output port. As such, the servo-control assembly 440 provides dynamic control of the coupling of the spectral channels into the respective output ports on a channel-by-channel basis and thereby manages the optical power levels of the spectral channels coupled into the output ports. The optical power levels of the spectral channels in the output ports may be dynamically managed according to demand, or maintained at desired values (e.g., equalized at a predetermined value) in the present invention.

By way of example, the processing unit 470 may apply an appropriate alternating (or "dither") control signal to a channel micromirror, in superposition with the dc control signal for maintaining the channel micromirror at a particular pivoting position. This enables both the optical power level of the corresponding spectral channel and the rate of change in the optical power level (or the time derivative of the optical power level) at the instant micromirror's pivoting angle to be obtained. In view of the exemplary coupling efficiency curve depicted in FIG. 1D, the rate of change in the optical power level is proportional to the slope of the coupling efficiency curve, and is therefore useful in locating the micromirror's pivoting angle corresponding to the measured optical power level. It is also useful in determining the magnitude of the feedback control signal to be applied to the channel micromirror, so as to achieve the desired coupling efficiency in a most effective manner.

FIG. 5 illustrates the well-known process of dithering. A curve 502 in the graph represents the optical coupling to a particular collimator for a particular mirror as a function of mirror angle. Vertical squiggles 504 represent dithering of the mirror at a frequency f for different nominal mirror angles. In embodiments of the present invention, the amplitudes of dither signals for coupling each mirror to each different output port may be different. These dither amplitudes are adjusted as described above. The dithering of the mirror produces a corresponding oscillation in an optical coupling signal for the output port. Horizontal squiggles 506 represent the derivative with respect to mirror position of the optical coupling signal (the error signal). At peak coupling the frequency is 2f, while at non-peak coupling the frequency is f with a phase shift of +/−180 degrees. At the peak coupling the average error signal is zero. The error signal is fed into a control loop (e.g., with a PID controller) that controls the mirror. The demodulated dither provides an error signal that can be used in a PID control loop to move the MEMS to optimal coupling. The PID controller adjusts the mirror angle in a way that optimizes the error signal for optimal optical coupling to the collimator.

The servo control assembly 440 typically includes one or more digital-to-analog converters (DACs) that convert digital information from the processing unit to open loop voltages that are applied to the channel micromirrors. The digital information corresponding to the applied voltages are referred to as DAC values. In embodiments of the present invention, the dithering amplitude for each micromirror is determined from stored DAC settings used to set the angle of the mirror to optically couple signals to the different output ports. As part of the optical alignment, the channel micromirrors 103 are positioned for optimal coupling of the optical path at each output port collimator. Corresponding open loop voltages, or DAC values are then stored, in non-volatile memory. FIG. 6 depicts an example of a graph of DAC value as a function of collimator (port) number for a given mirror in a switch of the type depicted in FIG. 1. The diamonds in FIG. 6 represent stored DAC settings. These DAC settings can be fit to a polynomial curve as shown by the dashed line in FIG. 6. An equation corresponding to the polynomial curve can provide information about the stiffness of the hinges used in the channel micromirrors 103. As described above, optimal coupling of the optical signal is achieved during operation by applying a small dither to the MEMS mirror and demodulating a sample of the light that is tapped off. Information about the hinge stiffness can be used to determine the appropriate dither amplitude for optimal coupling to a given port.

For example, it is often desired by the user of the WSS that the optical perturbation caused by the dither should be minimized. Contradicting requirements are that the dither should be small for stability and minimal optical perturbation and sufficiently large to provide a useful error signal for the control loop. These conflicting requirements can for the control system be reconciled using by calculating a slope based on stored alignment data. The control system design can be done using nominal mirror parameters. Using nominal parameters the control loop gain is adjusted to give a good response time with little or no overshoot to a step response. The gain can be adjusted by two parameters. One parameter is the dither amplitude and the other is a gain constant that multiplies the error signal. The dither amplitude must be large enough such that the optical disturbance is detected in the optical channel monitor with good signal-to-noise ratio and sufficiently small that it doesn't affect customer data traffic. Typically an optical disturbance of 0.5% at optimal coupling meets these criteria Once the dither amplitude is chosen the gain constant is then adjusted to give a good step response. Using a nominal mirror with a nominal optical platform the dither amplitude is adjusted to meet this criteria and the resulting value in DAC counts is REF_DITHER. In the same manner the collimator at the center of the range has the minimum mirror tilt and on a nominal optical platform will result in a slope of REF_SLOPE.

Based on the foregoing, a method has been developed to utilize DAC settings such as $REF_{13}$ DITHER and REF_SLOPE and DAC setting versus port number information of the type shown in FIG. 6 to set the dither amplitude of a given mirror for each different port. A general method 700 for adjusting dither amplitude of one or more MEMS mirrors in an optical switch is set forth in the flow diagram of FIG. 7 The optical switch may be as described above, e.g., generally including an input port, and an array of one or more MEMS mirrors that can be selectively optically coupled to one or more of N optical input/output (I/O) ports, where N is an integer greater than or equal to 3. The method begins at 702 by aligning the one or more MEMS mirrors to achieve nominal peak coupling at each of the N collimators. At 704, the DAC settings for positioning each mirror in an open control loop as a function of the selected collimator are stored to the memory 450 of the apparatus 400. At 706, a dither amplitude DITHER (x) is determined for one of the MEMS mirrors positioned to couple optical signals to an output port at a position x using the stored DAC settings. For example, for a given one of the mirrors, N signal values $S_c$ may be determined with each signal value $S_c$ corresponding to a signal applied to the given mirror to couple an optical signal between the input port and a different one of the N output ports. The N signal values may be fit to a polynomial of a parameter corresponding to a position of an output port (e.g., the port number). A slope of the polynomial may then be determined at a value corresponding to a given output port. A dither amplitude for the mirror may then be determined based on the value of the slope. For the purpose of illustration, determination of only one dither amplitude for one mirror is discussed. However, those of skill in the art will recognize that the same dither amplitude determination may be repeated for each mirror in a one-dimensional or two-dimensional array of channel micromirrors.

The feasibility of this technique has been demonstrated on a WavePath 4500 model wavelength selective switch (WSS) available from Capella Photonics of San Jose, Calif. In a design using a nominal MEMS mirror the slope the DAC count versus collimator has known reference value here denoted REF_SLOPE. Based on the control system design the reference dither amplitude will have a value denoted here as REF_DITHER. The data stored in non-volatile memory are the DAC values for each plate of the MEMS mirror for each collimator location. These values are used to determine the dither amplitude corresponding to each port. During boot up the following steps are executed as illustrated in the Flow diagram of FIG. 8.

At 802 the DAC values are read from non-volatile memory. At 804 the differential DAC drive of the mirror at each collimator position is calculated. This results in a vector that is 1×N for N collimators. For example, the DAC settings as a function of port number as illustrated in FIG. 6 may be stored as described above. Table I is an example of differential DAC values for a MEMS channel mirror in a WavePath 4500 WSS having 10 ports. Note that the set of DAC values will, in general, be different for each channel mirror.

TABLE I

| collimator | dy |
|---|---|
| 1 | 5144 |
| 2 | 4180 |
| 3 | 3070 |
| 4 | 1754 |
| 5 | 400 |
| 6 | −848 |
| 7 | −2384 |

TABLE I-continued

| collimator | dy |
|---|---|
| 8 | −3592 |
| 9 | −4636 |
| 10 | −5500 |

At 806, the DAC setting information from 804 is curve fit to a $3^{rd}$ order polynomial, e.g., of the form:

$$a_3c^3+a_2c^2+a_1c+a_0=DAC\_VALUE(k), k=1:N, \quad (Eq.\ 1)$$

where c is the collimator number. Note that in this case DAC_VALUE(k) is a specific example of the signal value $S_C$ referred to above with respect to FIG. 7. Fitting the N DAC values to the polynomial requires determination of four unknown coefficients. However if the collimators are arbitrarily re-numbered starting from 0 the first coefficient, a0, is immediately known, $$a0=DAC\_VALUE(1). \quad (Eq.\ 2)$$

What remains is to find three unknown coefficients from N>3 data points.

$$a_3c^3+a_2c^2+a_1c=DAC\_VALUE(k)-a_0, k=2:N \quad (Eq.\ 3)$$

This is an over-determined set of equations and has a solution that results in the least mean square error curve fit. The above N−1 equations can be written in the familiar matrix form A·x=b, where A is an N×3 matrix and b is an N×1 vector and x=$[a_3\ a_2\ a_1]^T$ are the unknown coefficients. The solution is $$x=(A^TA)^{-1}A^Tb. \quad (Eq.\ 4)$$

The matrix term $(A^TA)^{-1}A^T$ is size 3×N made up of polynomial terms of the collimator numbers. This matrix is pre-calculated offline and stored in the code as three row vectors each size 1×N, ($R_3$, $R_2$, and $R_1$).

The coefficients are calculated in firmware as the inner product $a_3=R_3 \cdot b$, $$a_2=R_2 \cdot b, \text{ and } a_1=R_1 \cdot b. \quad (Eq.\ 4)$$

Those of skill in the art will be able to implement the matrix operations described above as a sequence of computer instructions.

By way of numerical example, based on the differential DAC values of Table I, the corresponding third order polynomial is of the form:

$$10.256c^3-164.85c^2-506.93c+5791.1=DAC\_VALUE(k) \quad (Eq.\ 5)$$

Once the coefficients are known the slope at each collimator is calculated at 808 as:

$$slope(x)=3 \cdot a_3c^2+2 \cdot a_2c+a_1, c=0:N-1 \quad (Eq.\ 6)$$

Those of skill in the art will recognize that form of slope(x) is just the derivative of Eq. 4 with respect to c.

By way of numerical example, based on the coefficients of Eq. 6, the corresponding values of slope(x) for the different collimators are as given in Table II below.

TABLE II

| Collimator number (x) | slope(x) |
|---|---|
| 1 | −806 |
| 2 | −1043 |
| 3 | −1219 |

TABLE II-continued

| Collimator number (x) | slope(x) |
|---|---|
| 4 | −1333 |
| 5 | −1386 |
| 6 | −1377 |
| 7 | −1307 |
| 8 | −1175 |
| 9 | −982 |
| 10 | −727 |

Once slope(x) is known, the dither amplitude DITHER(x) at each collimator position x may be calculated at 810 from the previously determined values of REF_DITHER and REF_SLOPE as:

$$DITHER(x)=REF\_DITHER*slope(x)/REF\_SLOPE \quad (Eq.\ 6)$$

The calculations are described here for one channel micromirror but within the WSS the calculations are repeated for each mirror in the channel micromirror array 103.

An advantage of this method is that the dither amplitude can be tuned for each mirror in a large array rather than using a single fixed value. By adapting the dither amplitude to the specific mirror being controlled a wider range of MEMS process distribution can be used. Using a small dither on MEMS with weaker hinges maintains a smaller optical disturbance then if larger fixed dither amplitudes were to be used. From a control point of view the small signal gain of a weaker hinge is larger than a strong hinge and requires a smaller loop gain. Since the dither amplitude is part of the loop gain reducing the dither amplitude compensates for the loop gain for the weaker hinge.

While the above is a complete description of the preferred embodiment of the present invention, it is possible to use various alternatives, modifications and equivalents. Any feature described herein, whether preferred or not, may be combined with any other feature described herein, whether preferred or not. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for adjusting a dither amplitude of one or more MEMS mirrors in an optical switch having an input port, and an array of one or more MEMS mirrors that can be selectively optically coupled between the input port and one or more of N optical output ports, where N is an integer greater than or equal to 2, the method comprising:

aligning the one or more MEMS mirrors to achieve nominal peak coupling between the input port and each of the N output ports;

storing to a non-volatile memory digital-to-analog converter (DAC) settings for positioning each mirror in an open control loop as a function of the selected output port, wherein the DAC settings include N signal values $S_c$, wherein each signal value $S_c$ corresponds to a signal applied to the given mirror to position the mirror to couple an optical signal between the input port and a different one of the N output ports; and determining a dither amplitude DITHER(x) for one of the MEMS mirrors positioned to couple optical signals to an output port at a position x using the stored DAC settings, wherein determining the dither amplitude DITHER(x) includes:

fitting the N signal values to a polynomial of a parameter corresponding to a position of an output port;

determining a slope of the polynomial at a value of the parameter corresponding to a given output port; and determining the dither amplitude DITHER(x) based on the value of the slope.

2. The method of claim 1 wherein the polynomial is of the form $a_3c^3+a_2c^2+a_1c+a_o=S_c$, where c is an integer representing the position of one of the output ports in an array.

3. The method of claim 2 wherein the dither amplitude DITHER(x) for an output port at position x is given by $$DITHER(x) = REF\_DITHER * slope(x)/REF\_SLOPE,$$

where x is an integer representing the position of an output port in an array, REF_DITHER is a dither amplitude value determined from a design of the MEMS mirror REF_SLOPE is a slope value determined from a design of a control system that controls an angle of the MEMS mirror and slope(x) is a value of the slope at output port position x.

4. The method of claim 3 wherein the slope(x) has the form $slope(x)=3 \cdot a_3c^2+2 \cdot a_2c+a_1$.

5. An optical switch apparatus, comprising:

A plurality of optical input/output (I/O) ports, including an input port and N output ports, where N is an integer greater than or equal to 2;

and an array of one or more MEMS mirrors that can selectively reflect one or more spectral channels from the input port to one or more of the N output ports; and a servo-control assembly in communication with said one or more of the MEMS mirrors, said servo-control assembly being adapted to control each of said one or more MEMS mirrors and thereby maintaining a predetermined coupling of each reflected spectral channel into one of said output ports, wherein the servo control assembly includes memory containing digital-to-analog converter (DAC) settings for positioning each mirror in an open control loop as a function of a port position x, wherein the DAC settings include N signal values $S_c$, wherein each signal value $S_c$, corresponds to a signal applied to the given mirror to position the mirror to couple an optical signal between an input port and a different one of the N-1 output ports, wherein the servo control assembly includes a processing unit programmed with a set of instructions for implementing a method of adjusting a dither amplitude of one or more of the MEMS mirrors, the set of instructions including an instruction for determining a dither amplitude DITHER (x) for one of the MEMS mirrors positioned to couple optical signals to one of the output ports at a position x using the stored DAC settings, wherein determining the dither amplitude DITHER(x) includes:

fitting the N signal values to a polynomial of a parameter corresponding to a position of an output port;

determining a slope of the polynomial at a value of the parameter corresponding to a given one of the $N_{13}$ output ports;

determining the dither amplitude DITHER(x) based on the value of the slope.

6. The apparatus of claim 5 wherein the polynomial is of the form $a_3c^3+a_2c^2+a_1c+a_o=S_c$, where c is an integer representing the position of one of the N output ports in an array.

7. The apparatus of claim 6 wherein the dither amplitude DITHER(x) for an output port at position x is given by $$DITHER(x)=REF\_DITHER*slope(x)/REF\_SLOPE,$$

where x is an integer representing the position of an output port in the array, REF_DITHER is a dither amplitude value determined from a design of the MEMS mirror, REF_SLOPE is a slope value determined from a design of a control system that controls an angle of the MEMS mirror and slope(x) is a value of the slope at output port position x.

8. The apparatus of claim 7 wherein the slope(x) has the form $slope(x)=3 \cdot a_3c^2=2 \cdot a_2c=a_1$.

9. The apparatus of claim 5 wherein the N I/O ports include a plurality of fiber collimators, providing an input port for a multi-wavelength optical signal and a plurality of output ports.

10. The apparatus of claim 9 further comprising:

a wavelength-separator, for separating said multi-wavelength optical signal from said input port into multiple spectral channels; and a beam-focuser, for focusing said spectral channels into corresponding spectral spots;

wherein the array of one or more MEMS mirrors is a spatial array of channel micromirrors positioned such that each channel micromirror receives one of said spectral channels, said channel micromirrors being individually and continuously controllable to reflect said spectral channels into selected ones of said output ports.

11. The apparatus of claim 10 wherein the spatial array of channel micromirrors is a one-dimensional array.

12. The apparatus of claim 10 wherein the spatial array of channel micromirrors is a two-dimensional array.

13. The apparatus of claim 5 wherein said servo-control assembly includes a spectral monitor for monitoring power levels of said spectral channels coupled into said I/O ports, and a processing unit responsive to said power levels for providing control of said MEMS micromirrors.

14. The apparatus of claim 5 wherein each MEMS mirror is rotatable about one or more axes.

* * * * *